(12) United States Patent
Sakai et al.

(10) Patent No.: US 10,807,353 B2
(45) Date of Patent: Oct. 20, 2020

(54) SUPPORT MATERIAL FOR LAMINATE SHAPING, PRODUCT LAMINATE-SHAPED BY USING THE SAME, AND LAMINATE-SHAPED PRODUCT PRODUCTION METHOD

(71) Applicant: MITSUBISHI CHEMICAL CORPORATION, Tokyo (JP)

(72) Inventors: Norihito Sakai, Osaka (JP); Shusaku Mandai, Osaka (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 0 days.

(21) Appl. No.: 16/521,867

(22) Filed: Jul. 25, 2019

(65) Prior Publication Data

US 2019/0344553 A1    Nov. 14, 2019

Related U.S. Application Data

(63) Continuation of application No. 15/312,290, filed as application No. PCT/JP2015/065334 on May 28, 2015, now abandoned.

(30) Foreign Application Priority Data

May 29, 2014  (JP) .................................. 2014-111373
Jul. 2, 2014   (JP) .................................. 2014-136886

(51) Int. Cl.
| | | |
|---|---|---|
| B29C 67/00 | (2017.01) | |
| B33Y 10/00 | (2015.01) | |
| C08L 29/04 | (2006.01) | |
| C08L 53/02 | (2006.01) | |
| B33Y 70/00 | (2020.01) | |
| C08F 218/08 | (2006.01) | |
| B29C 64/40 | (2017.01) | |
| B29C 64/118 | (2017.01) | |
| B33Y 30/00 | (2015.01) | |
| B29K 29/00 | (2006.01) | |
| B29C 64/106 | (2017.01) | |
| B29K 55/02 | (2006.01) | |

(52) U.S. Cl.
CPC .......... *B33Y 10/00* (2014.12); *B29C 64/118* (2017.08); *B29C 64/40* (2017.08); *B29C 67/00* (2013.01); *B33Y 30/00* (2014.12); *B33Y 70/00* (2014.12); *C08F 218/08* (2013.01); *C08L 29/04* (2013.01); *C08L 53/02* (2013.01); *B29C 64/106* (2017.08); *B29K 2029/04* (2013.01); *B29K 2055/02* (2013.01); *B29K 2829/04* (2013.01); *B29K 2995/0039* (2013.01); *B29K 2995/0096* (2013.01); *B29K 2995/0098* (2013.01)

(58) Field of Classification Search
CPC ......... B33Y 10/00; B33Y 30/00; B33Y 70/00; B29C 64/40; B29C 64/106; B29K 2029/04; B29K 2829/04; B29K 2995/0039; B29K 2995/0098; B29K 2055/02; C03F 218/08; C08L 29/04; C08L 53/02
USPC ......................................................... 264/308
See application file for complete search history.

(56) References Cited

U.S. PATENT DOCUMENTS

| | | | |
|---|---|---|---|
| 6,067,480 A | 5/2000 | Stuffle | |
| 6,070,107 A | 5/2000 | Lombardi et al. | |
| 6,228,923 B1 | 5/2001 | Lombardi et al. | |
| 6,437,034 B2 | 8/2002 | Lombardi et al. | |
| 2001/0025073 A1 | 9/2001 | Lombardi et al. | |
| 2003/0175162 A1 | 9/2003 | Anazawa et al. | |
| 2007/0132158 A1 | 6/2007 | Martinori et al. | |
| 2011/0060445 A1* | 3/2011 | Heenan | B29C 64/106 700/119 |
| 2012/0157627 A1* | 6/2012 | Shibutani | C08L 29/04 525/57 |
| 2014/0182775 A1 | 7/2014 | Taniuchi et al. | |

FOREIGN PATENT DOCUMENTS

| | | |
|---|---|---|
| CN | 1437560 A | 8/2003 |
| CN | 1874883 A | 12/2006 |
| JP | 2002-516346 A | 6/2002 |
| JP | 2011-20412 A | 2/2011 |
| JP | 2012-40726 A | 3/2012 |
| JP | 2014-24329 A | 2/2014 |

OTHER PUBLICATIONS

International Search Report issued with respect to Application PCT/JP2015/065334, dated Aug. 18, 2015.

(Continued)

*Primary Examiner* — Joseph S Del Sole
*Assistant Examiner* — Lawrence D. Hohenbrink, Jr.
(74) *Attorney, Agent, or Firm* — Greenblum & Bernstein, P.L.C.

(57) ABSTRACT

A laminate shaping support material is provided which includes one of: a resin composition containing a polyvinyl alcohol resin having a primary hydroxyl group at its side chain, and having a heat of fusion of 10 to 30 J/g at its melting point (Embodiment (X)); and a resin composition containing a polyvinyl alcohol resin, and a block copolymer including a polymer block of an aromatic vinyl compound, at least one of a polymer block of a conjugated diene compound and a block of a hydrogenated conjugated diene compound, and a functional group reactive with a hydroxyl group (Embodiment (Y)). Therefore, the laminate shaping support material according to Embodiment (X), for example, is excellent in shape stability and adhesiveness to a model material. The laminate shaping support material according to Embodiment (Y) is excellent in peelability and forming stability.

4 Claims, No Drawings

(56) References Cited

OTHER PUBLICATIONS

International Preliminary Report on Patentability issued with respect to Application PCT/JP2015/065334, dated Nov. 29, 2016.
Supplemental European Search Report from Application No. 15799831.1, dated Nov. 15, 2017.
Chinese Office Action, Chinese Patent Office, Application No. 201580025736.7, dated May 5, 2019, with English Translation.

* cited by examiner

SUPPORT MATERIAL FOR LAMINATE SHAPING, PRODUCT LAMINATE-SHAPED BY USING THE SAME, AND LAMINATE-SHAPED PRODUCT PRODUCTION METHOD

The present application is a Continuation of U.S. application Ser. No. 15/312,290, filed Nov. 18, 2016, which is a National stage of International Patent Application No. PCT/JP2015/065334, filed May 28, 2015, which claims priority to Japanese Application No. 2014-111373, filed May 29, 2014 and Japanese Application No. 2014-136886, filed Jul. 2, 2014, the contents of which are expressly incorporated by reference herein in their entireties.

TECHNICAL FIELD

The present invention relates to a laminate shaping support material to be used for laminate shaping and thereafter removed (hereinafter sometimes referred to simply as "support material") and a product laminate-shaped by using the support material. The invention further relates to a laminate-shaped product production method. More specifically, the invention relates to a laminate shaping support material which is excellent in shape stability, adhesiveness to a model material, peelability and forming stability.

The term "model material" means a material for the product to be shaped, and the term "support material" means a support-forming material which facilitates the shaping of the model material and is removed after the shaping in most cases.

BACKGROUND ART

The term "laminate shaping" means a method of shaping a three-dimensional product having a predetermined structure. A fluid material is solidified immediately after being extruded, and further laid over the solidified material, whereby the product is shaped. A UV-curing method, a fusion laminate method and the like are proposed for the laminate shaping method. The fusion laminate method is widely employed because of the simplified structure of a laminate shaping device.

The term "support material" means a material which is used for the laminate shaping of the three-dimensional product to complement the intended three-dimensional structure to fill an absent portion of the structure. The three-dimensional product to be laminate-shaped has a variety of structural portions and, in the laminate shaping process, some of the structural portions cannot be shaped without support with other material. The support material is used for supporting the structural portions of the three-dimensional product in the shaping process, and finally removed.

Conventionally, a variety of support materials for the laminate shaping are studied, which are classified into those that are dissolved away in a liquid after the shaping, those that are ground off after the shaping, and those that are blown off by a liquid or a gas after the shaping.

Where the three-dimensional product has a complicated shape, it is difficult to grind off the support material without any damage to the product. The support material adapted to be blown off problematically has an insufficient strength, failing to sufficiently support the product. To cope with these problems, a support material adapted to be dissolved away in a liquid is proposed (PTL 1).

Exemplary water-soluble resins proposed for use as a support material to be washed away with water include an amorphous poly(2-ethyl-2-oxazoline) (PTL 2) and a polyvinyl alcohol (hereinafter abbreviated as PVA) (PTL 3). Particularly, PTL 3 proposes that a styrene-ethylene-butylene-styrene block copolymer (SEBS) is added to an amorphous PVA to impart the PVA with flexibility. The amorphous water-soluble resin is less liable to contract when being cooled to be solidified and, therefore, is excellent in shape reproducibility.

Further, a variety of model materials for shaping the three-dimensional product are studied, and an acrylonitrile-butadiene-styrene (ABS) resin is mainly used in consideration of melt formability, heat stability and mechanical properties after solidification thereof.

RELATED ART DOCUMENT

Patent Document

PTL 1: JP-A-2014-24329
PTL 2: JP-A-2002-516346
PTL 3: US-A-2011-0060445

SUMMARY OF INVENTION

However, the support materials hitherto proposed are liable to deform when a support material layer or a model material layer is laid over a previously formed support material layer before the previous layer is sufficiently cooled. Therefore, the support materials suffer from unstable shape and insufficient adhesiveness to the model material. This problematically reduces the shape reproducibility due to an offset between the support material layer and the model material layer. Therefore, the support materials are unsatisfactory, and still require improvement.

Further, a method of entirely dissolving the support material to actually remove the support material is time-consuming. Therefore, a method to be generally employed is such that, after the shaping, the support material is physically peeled off from the model material to some extent and then a remaining portion of the support material is dissolved away. The amorphous PVA proposed as the support material in PTL 3 cannot be easily peeled off with difficulty in deformation after the solidification, so that the amount of the support material to be dissolved away is increased. The support material prepared by adding the SEBS to the amorphous PVA is soft and deformable, but is insufficient in toughness. Therefore, the support material cannot be successfully peeled off, but is torn. Further, the affinity between the PVA resin and the SEBS is weak, so that the melt formability is unstable and the shape reproducibility is reduced in the laminate shaping.

Thus, the conventional support materials are unsatisfactory in the aforementioned aspects, still requiring improvement.

It is an object of the present invention to provide a laminate shaping support material improved in shape stability, adhesiveness to the model material, peelability and forming stability without the aforementioned problems.

As a result of intensive studies in view of the foregoing, the inventors of the present invention found that the aforementioned problems are solved by using a resin composition (Embodiment (X)) containing a PVA resin having a heat of fusion of 10 to 30 J/g at its melting point and including a structural unit having a primary hydroxyl group at its side chain (preferably, a PVA resin having a 1,2-diol structural unit at its side chain wherein the structural unit having the primary hydroxyl group at its side chain is a structural unit having a 1,2-diol structure at its side chain (hereinafter sometimes referred to simply as "1,2-diol-containing PVA resin")) or by using a resin composition (Embodiment (Y)) containing a PVA resin and a block copolymer including a polymer block of an aromatic vinyl compound, at least one of a polymer block of a conjugated diene compound and a block of a hydrogenated conjugated diene compound, and a functional group reactive with a hydroxyl group (hereinafter sometimes referred to simply as "block copolymer"), and attained the present invention.

It is assumed that these effects are based on the following mechanisms:

(1) Embodiment (X)

The heat of fusion of the PVA resin at the melting point is an index indicating the crystallinity of the PVA resin. In order to ensure the shape stability, it is conventionally considered advantageous to use an amorphous water-soluble resin as the support material. However, the studies conducted by the inventors reveal that, where the amorphous support material is used, the shape stability cannot be ensured. This is because, with a recent trend toward increase in laminate-shaping speed, thermal deformation is liable to occur when a support material layer or a model material layer is laid over a support material layer previously formed by melt-extruding the support material before the previous support material layer is sufficiently cooled. To cope with this, a support material excellent in shape stability and adhesiveness to the model material is designed by employing the PVA resin having a specific crystallinity (i.e., a heat of fusion of 10 to 30 J/g at its melting point) and including the structural unit having the primary hydroxyl group at its side chain (particularly, including the 1,2-diol structural unit at its side chain). Where the support material has insufficient adhesiveness to the model material, an offset occurs in an interface between the support material and the model material, making it impossible to ensure the shape reproducibility. Where the PVA resin having the primary hydroxyl group at its side chain (particularly, the 1,2-diol-containing PVA resin) is used for the support material, in contrast, the support material has an improved affinity for the model material and hence higher adhesiveness to the model material to be thereby improved in shape reproducibility.

(2) Embodiment (Y)

The mechanism of the aforementioned effects is as follows. With the PVA resin and the block copolymer forming a sea-island structure, the support material per se is flexible and deformable. Further, the block copolymer has the functional group reactive with the hydroxyl group of the PVA resin. Therefore, when the support material is peeled off, a sufficient adhesive force is provided in an interface between the block copolymer serving as an island component and the PVA resin serving as the sea component in the support material. Thus, the support material is deformed without cracking to be thereby removed from the model material without fracture. Further, the block copolymer preferably has an affinity for the PVA resin. Since the block copolymer has the functional group reactive with the hydroxyl group of the PVA resin, the support material melt-extruded for the laminate shaping has an improved forming stability.

JP-A-2011-173998 proposes a latex which is prepared by melt-kneading a PVA and a thermoplastic styrene elastomer having a carboxylic acid group or a derivative of the carboxylic acid group at its side chain and dispersing the thermoplastic styrene elastomer in water with the PVA resin of the resulting mixture dissolved in water. This literature neither states that the resin composition (latex) containing the PVA resin and the thermoplastic styrene elastomer having the carboxylic acid group is usable as a support material for laminate shaping, nor discloses physical properties of the resin composition required for the laminate shaping and the formulation of the resin composition required for the physical properties.

Further, JP-A-2011-74364 proposes a resin composition containing a PVA polymer, a block copolymer including a polymer block of an aromatic vinyl compound free from a carboxyl group and at least one of a polymer block of a conjugated diene compound and a block of a hydrogenated conjugated diene compound, and a block copolymer having a carboxyl group. This literature mentions only the flexural fatigue resistance and the gas barrier property of a film formed from the resin composition, but neither states that the resin composition is usable as a support material for laminate shaping, nor discloses physical properties of the resin composition required for the laminate shaping and the formulation of the resin composition required for the physical properties.

According to a first aspect of the present invention, there is provided a laminate shaping support material containing one of:
(X) a resin composition containing a polyvinyl alcohol resin including a structural unit having a primary hydroxyl group at its side chain, and having a heat of fusion of 10 to 30 J/g at its melting point (Embodiment (X)); and
(Y) a resin composition containing a polyvinyl alcohol resin, and a block copolymer including a polymer block of an aromatic vinyl compound, at least one of a polymer block of a conjugated diene compound and a block of a hydrogenated conjugated diene compound, and a functional group reactive with a hydroxyl group (Embodiment (Y)).

According to a second aspect of the present invention, there is provided a product laminate-shaped by using the laminate-shaping support material of the first aspect.

According to a third aspect of the present invention, there is provided a laminate-shaped product production method including the steps of: alternately laying a layer of the laminate-shaping support material of the first aspect and a layer of a model material one on another in a fluid state; solidifying the support material and the model material; and removing the support material.

The laminate shaping support material of Embodiment (X) of the present invention is excellent in shape stability and adhesiveness (adhesion) to the model material.

The laminate shaping support material of Embodiment (Y) of the present invention is excellent in peelability and forming stability.

DESCRIPTION OF EMBODIMENTS

The present invention provides laminate shaping support materials, which respectively include resin compositions according to two different embodiments. The laminate shaping support materials according to the two embodiments of the present invention will hereinafter be described.

Embodiment (X)

The laminate shaping support material according to Embodiment (X) employs a resin composition (X) which contains a specific PVA resin including a structural unit having a primary hydroxyl group at its side chain, and having a heat of fusion of 10 to 30 J/g at its melting point.

The specific PVA resin will hereinafter be described in detail.

[Specific PVA Resin]

The specific PVA resin to be used in Embodiment (X) includes the structural unit having the primary hydroxyl group at its side chain. The number of primary hydroxyl groups is typically 1 to 5, preferably 1 to 2, particularly preferably 1. Further, the specific PVA resin preferably has a secondary hydroxyl group in addition to the primary hydroxyl group.

Examples of the specific PVA resin include a PVA resin having a 1,2-diol structural unit at its side chain, and a PVA resin having a hydroxyalkyl group structural unit at its side chain. Particularly, the PVA resin having the 1,2-diol structural unit at its side chain is preferred because the resulting support material has an improved affinity for a model material and higher adhesiveness to the model material.

In the specific PVA resin, the proportion (modification ratio) of the structural unit having the primary hydroxyl group at its side chain differs depending upon the type of the structural unit, but typically 0.1 to 10 mol %. If the modification ratio is excessively low, the support material tends to have a reduced adhesiveness to the model material. If the modification ratio is excessively high, the support material tends to have an excessively low crystallization speed, resulting in deformation during laminate shaping. Further, the support material tends to have a lower adhesive force with respect to the model material.

The specific PVA resin typically has an average polymerization degree of 150 to 4000, preferably 200 to 2000 (as measured in conformity with JIS K6726). If the average polymerization degree is excessively low, stable shaping tends to be difficult in the laminate shaping. If the average polymerization degree is excessively high, the resin composition tends to have an excessively high viscosity, making it difficult to perform a melt-forming process.

The viscosity of an aqueous solution of the specific PVA resin is sometimes employed as an index of the polymerization degree of the PVA resin. The 1,2-diol-containing PVA resin typically has a viscosity of 1.5 to 20 mPa·s, preferably 2 to 12 mPa·s, particularly preferably 2.5 to 8 mPa·s. If the viscosity is excessively low, stable shaping tends to be difficult in the laminate shaping. If the viscosity is excessively high, the resin composition tends to have an excessively high viscosity, making it difficult to perform the melt-forming process.

The viscosity of the 1,2-diol-containing PVA resin herein means a viscosity of a 4 wt. % aqueous solution of the 1,2-diol-containing PVA resin measured at 20° C. in conformity with JIS K6726.

The specific PVA resin typically has a saponification degree of not less than 70 mol %, preferably not less than 80 mol %. If the saponification degree is excessively low, the shape stability tends to be reduced during the laminate shaping.

The saponification degree is measured in conformity with JIS K6726.

Next, the PVA resin having the 1,2-diol structural unit at its side chain will be described in detail.

A specific example of the PVA resin having the 1,2-diol structural unit at its side chain is a PVA resin having a 1,2-diol structural unit represented by the following general formula (1). Since the PVA thus has the 1,2-diol structural unit at its side chain, the support material is advantageously improved in affinity for the model material. In the general formula (1), $R^1$, $R^2$ and $R^3$ are independently each a hydrogen atom or a C1 to C4 alkyl group, X is a single bond or a bonding chain, $R^4$, $R^5$ and $R^6$ are independently each a hydrogen atom or a C1 to C4 alkyl group.

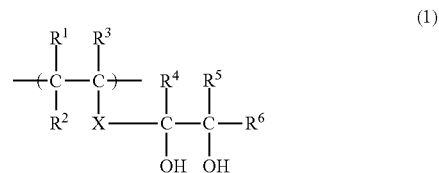

(1)

wherein $R^1$, $R^2$ and $R^3$ are independently each a hydrogen atom or a C1 to C4 alkyl group, X is a single bond or a bonding chain, $R^4$, $R^5$ and $R^6$ are independently each a hydrogen atom or a C1 to C4 alkyl group.

The proportion (modification ratio) of the 1,2-diol structural unit represented by the general formula (1) for the 1,2-diol-containing PVA resin is typically 0.1 to 10 mol %, preferably 0.5 to 9 mol %, more preferably 2 to 8 mol %, particularly preferably 3 to 8 mol %. If the modification ratio is excessively low, the support material tends to have a reduced adhesiveness to the model material. If the modification ratio is excessively high, the support material tends to have an excessively low crystallization speed, resulting in deformation during the laminate shaping. Further, the support material tends to have a lower adhesive force with respect to the model material. Like an ordinary PVA resin, the 1,2-diol-containing PVA resin includes a vinyl alcohol structural unit and an unsaponified vinyl ester structural unit, in addition to the 1,2-diol structural unit.

In the 1,2-diol structural unit represented by the general formula (1), $R^1$ to $R^3$ and $R^4$ to $R^6$ are preferably all hydrogen atoms with the primary hydroxyl group being present at a side chain terminal for improvement of the adhesiveness to the model material. However, some of $R^1$ to $R^3$ and $R^4$ to $R^6$ may be substituted with a C1 to C4 alkyl group, as long as the properties of the resin are not significantly impaired. Examples of the C1 to C4 alkyl group include a methyl group, an ethyl group, a n-propyl group, an isopropyl group, a n-butyl group, an isobutyl group and a tert-butyl group, which may have a substituent such as a halogen atom, a hydroxyl group, an ester group, a carboxylic acid group or a sulfonic acid group as required.

In the 1,2-diol structural unit represented by the general formula (1), X is typically a single bond. For heat stability, X is most preferably a single bond, but may be a bonding chain as long as the effects of the present invention are not impaired. The bonding chain is not particularly limited, but examples of the bonding chain include hydrocarbons such as alkylenes, alkenylenes, alkynylenes, phenylene and naphthylene (which may be substituted with a halogen such as fluorine, chlorine or bromine), —O—, —($CH_2$O)$_m$—, —(O$CH_2$)$_m$—, —($CH_2$O)$_m$$CH_2$—, —CO—, —COCO—, —CO($CH_2$)$_m$CO—, —CO($C_6H_4$)CO—, —S—, —CS—, —SO—, —$SO_2$—, —NR—, —CONR—, —NRCO—, —CSNR—, —NRCS—, —NRNR—, —$HPO_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)— and —OAl(OR)O—, wherein Rs are independently each a given substituent, preferably a hydrogen atom or an alkyl group, and m is a natural number. Among these, the bonding chain is preferably an alkylene group having a carbon number of not greater than 6 for stability during production or during use, particularly preferably a methylene group or —CH$_2$OCH$_2$—.

The 1,2-diol-containing PVA resin typically has an average polymerization degree of 150 to 4000, preferably 200 to 2000, particularly preferably 250 to 800 (as measured in conformity with JIS K6726). If the average polymerization degree is excessively low, stable shaping tends to be difficult in the laminate shaping. If the average polymerization degree is excessively high, the melt forming tends to be difficult.

The viscosity of an aqueous solution of the PVA resin is sometimes employed as an index of the polymerization degree of the PVA resin. The 1,2-diol-containing PVA resin typically has a viscosity of 1.5 to 20 mPa·s, preferably 2 to 12 mPa·s, particularly preferably 2.5 to 8 mPa·s. If the viscosity is excessively low, stable shaping tends to be difficult in the laminate shaping. If the viscosity is excessively high, the resin composition tends to have an excessively high viscosity, making it difficult to perform the melt-forming process.

The viscosity of the 1,2-diol-containing PVA resin herein means a viscosity of a 4 wt. % aqueous solution of the 1,2-diol-containing PVA resin measured at 20° C. in conformity with JIS K6726.

The 1,2-diol-containing PVA resin typically has a saponification degree of not less than 70 mol %, preferably 75 to 99.7 mol %, particularly preferably 87 to 99.5 mol %. If the saponification degree is excessively low, the shape stability tends to be reduced during the laminate shaping.

The saponification degree is measured in conformity with JIS K6726.

The main chain of the PVA resin mainly has 1,3-diol bonds, and the proportion of 1,2-diol bonds in the main chain is about 1.5 to about 1.7 mol %. The PVA resin to be used may contain the 1,2-diol bonds in a proportion increased to 2.0 to 3.5 mol % by increasing the polymerization temperature in the polymerization of the vinyl ester monomer.

In Embodiment (X), the PVA resin may be a copolymer obtained by copolymerization with a small amount of other comonomer, as long as the properties of the resin are not significantly influenced. Examples of the comonomer include: olefins such as ethylene, propylene, isobutylene, α-octene, α-dodecene and α-octadecene; unsaturated acids such as acrylic acid, methacrylic acid, crotonic acid, maleic acid, maleic anhydride and itaconic acid, and salts, monoalkyl and dialkyl esters thereof; nitriles such as acrylonitrile and methacrylonitrile; amides such as acrylamide and methacrylamide; olefin sulfonic acids such as ethylene sulfonic acid, allyl sulfonic acid and methallyl sulfonic acid, and salts thereof; alkyl vinyl ethers, N-acrylamide methyl trimethyl ammonium chloride, allyl trimethylammonium chloride, dimethylallyl vinyl ketone, N-vinylpyrrolidone, vinyl chloride and vinylidene chloride; polyoxyalkylene (meth)allyl ethers such as polyoxyethylene (meth)allyl ethers and polyoxypropylene (meth)allyl ethers; polyoxyalkylene (meth)acrylates such as polyoxyethylene (meth)acrylates and polyoxypropylene (meth)acrylates; polyoxyalkylene (meth)acrylamides such as polyoxyethylene (meth)acrylamides and polyoxypropylene (meth)acrylamides; and hydroxyl group-containing α-olefins such as polyoxyethylene (1-(meth)acrylamide-1,1-dimethylpropyl) esters, polyoxyethylene vinyl ethers, polyoxypropylene vinyl ethers, polyoxyethylene allylamines, polyoxypropylene allylamines, polyoxyethylene vinylamines, polyoxypropylene vinylamines, 3-buten-1-ol, 4-penten-1-ol and 5-hexen-1-ol, and acylation products and other derivatives thereof.

The 1,2-diol-containing PVA resin typically has a melting point of 120° C. to 230° C., preferably 150° C. to 220° C., particularly preferably 160° C. to 190° C. If the melting point is excessively high, the resin is liable to be deteriorated with the need for increasing the process temperature in the laminate shaping. If the melting point is excessively low, the shape stability tends to be reduced during the laminate shaping.

In Embodiment (X), the PVA resin including the structural unit having the primary hydroxyl group at its side chain, preferably the 1,2-diol-containing PVA resin, is required to have a heat of fusion of 10 to 30 J/g, preferably 15 to 27 J/g, particularly preferably 20 to 25 J/g, at its melting point. If the heat of fusion is excessively high, the support material tends to significantly shrink during solidification thereof and hence have poorer shape stability. If the heat of fusion is excessively low, a layer of the support material tends to deform when the next layer is formed in the laminate shaping.

The method of measuring the heat of fusion at the melting point will be described below in detail. A differential scanning calorimeter of an input compensation type is used for the measurement. The measurement is started at a measurement starting temperature that is lower than the melting point by not less than 50° C., typically about −30° C. to about 30° C., and the measurement temperature is increased from the measurement starting temperature at a temperature increase rate of 10° C./min to a target temperature that is higher by about 30° C. than the melting point so as prevent the thermal decomposition of the resin. Thereafter, the measurement temperature is reduced at a temperature decrease rate of 10° C./min to the measurement starting temperature, and then increased again at a temperature increase rate of 10° C./min to a target temperature that is higher by about 30° C. than the melting point. The heat ΔH (J/g) of fusion is calculated based on a heat absorption peak area observed at the melting point in the second temperature increase. The first target temperature and the second target temperature are not necessarily required to be the same. The amount of a sample to be used for the measurement differs depending upon the measurement apparatus and the size of the container (pan) to be used, but typically about 5 to about 10 mg. If the amount of the sample is excessively great or excessively small, the error of the measurement of the heat of fusion is increased. What is important for the calculation of the heat ΔH of fusion is how to draw a base line. In an analysis chart, an abscissa axis is defined as the axis of the temperature, and the base line is defined as a straight line connecting a point A at a temperature higher by 5° C. than an end point of the absorption peak of a DSC curve and a point B at a temperature lower by 40° C. than the apex of the heat absorption peak of the DSC curve. The heat ΔH of fusion is calculated based on an area enclosed by the base line and the heat absorption peak.

The production method of the 1,2-diol-containing PVA resin to be advantageously used in Embodiment (X) is not particularly limited, but examples of the production method include: (i) a method in which a copolymer of a vinyl ester monomer and a compound represented by the following general formula (2) is saponified; (ii) a method in which a copolymer of a vinyl ester monomer and a compound represented by the following general formula (3) is saponified and decarbonated; and (iii) a method in which a copolymer of a vinyl ester monomer and a compound represented by the following general formula (4) is saponified and deketalized. The 1,2-diol-containing PVA resin may be produced, for example, by a method described in paragraphs [0014] to [0037] in JP-A-2008-163179.

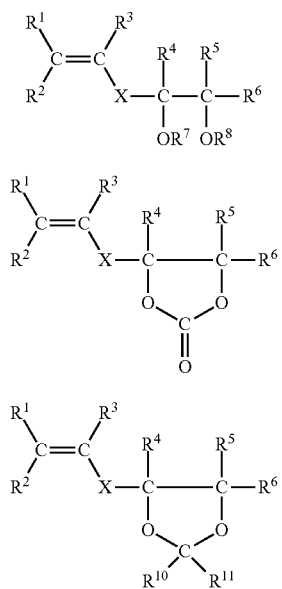

In the above general formulae (2), (3) and (4), $R^1$, $R^2$, $R^3$, x, $R^4$, $R^5$ and $R^6$ are the same as those for the general formula (1), and $R^7$ and $R^8$ are independently each a hydrogen atom or $R^9$—CO— wherein $R^9$ is a C1 to C4 alkyl group. $R^{10}$ and $R^{11}$ are independently each a hydrogen atom or a C1 to C4 alkyl group.

[Laminate Shaping Support Material According to Embodiment (X)]

The laminate shaping support material according to Embodiment (X) is a resin composition which contains the PVA resin including the structural unit having the primary hydroxyl group at its side chain, preferably the 1,2-diol-containing PVA resin, as a main component. The support material is generally formed into a strand, which is wound around a reel and, in this state, set in a laminate shaping apparatus. Therefore, the support material is required to have flexibility and toughness that are sufficient to prevent breakage when being wound around the reel. For practical use, a flexible component is preferably added to the resin composition. In the support material according to Embodiment (X), the PVA resin including the structural unit having the primary hydroxyl group at its side chain, preferably the 1,2-diol-containing PVA resin, is typically present in a proportion of 50 to 100 wt. %, preferably 55 to 95 wt. %, particularly preferably 60 to 90 wt. %, based on the overall weight of the support material. If the proportion of the PVA resin is excessively small, the support material tends to be poorer in dissolvability. If the proportion of the PVA resin is excessively great, the support material tends to be poorer in flexibility.

A thermoplastic resin is usable as the flexible component. Examples of the thermoplastic resin include polyolefin resins, polyester resins, polyamide resins, acryl resins, polyvinyl resins (polyvinyl acetates, polyvinyl chlorides and the like) and thermoplastic elastomers.

Examples of the thermoplastic elastomers include urethane elastomers, ester elastomers and styrene elastomers. A block copolymer including a polymer block of an aromatic vinyl compound, and at least one of a polymer block of a conjugated diene compound and a block of a hydrogenated conjugated diene compound is preferably used as the thermoplastic elastomer. The block copolymer preferably has a functional group reactive with a hydroxyl group to impart the support material with toughness, and the functional group is particularly preferably an acid. The block copolymer preferably has an acid value of 1 to 10 mg $CH_3CONa/g$, particularly preferably 2 to 5 mg $CH_3CONa/g$. The acid value is measured by a neutralization titration method by which an alkali consumption required for neutralization is determined.

The proportion of the flexible component is preferably 5 to 50 wt. %, more preferably 10 to 40 wt. %, particularly preferably 15 to 35 wt. %, based on the weight of the PVA resin including the structural unit having the primary hydroxyl group at its side chain.

A plasticizer may be added to the support material according to Embodiment (X). In order to stabilize the shape of the support material according to Embodiment (X), the proportion of the plasticizer is preferably minimized, and preferably not greater than 20 wt. %, more preferably not greater than 10 wt. %, particularly preferably not greater than 1 wt. %, especially preferably not greater than 0.1 wt. %.

In addition to the aforementioned component, known additives such as a filler, an antioxidant, a colorant, an antistatic agent, a UV absorber and a lubricant may be added to the resin composition as required.

The support material according to Embodiment (X) has a melt flow rate of 0.2 to 25 g/10 min, particularly preferably 1.0 to 15 g/min, more preferably 2.0 to 10 g/10 min, as measured at 210° C. with a load of 2160 g in conformity with JIS K7210 as an index of the melt viscosity. If the melt viscosity is excessively low, the support material is liable to drip from a nozzle during the shaping, preventing proper shaping. If the melt viscosity is excessively high, the nozzle is liable to be clogged.

The production method of the support material of Embodiment (X) for the laminate shaping includes the steps of: mixing the aforementioned ingredients in predetermined proportions; kneading the resulting mixture in a melted state with heating; extruding the mixture into a strand; cooling the strand; and winding the strand around a reel. More specifically, the aforementioned ingredients are fed as a mixture or separately into a single-screw or multi-screw extruder, heat-melted and kneaded, and extruded from a single-hole or multi-hole strand die into a 1.5- to 3.0-mm diameter strand, which is in turn cooled with air or with water to be solidified and then wound around the reel. The strand is required to have a stable diameter and have flexibility and toughness sufficient to prevent breakage even if being wound around the reel. Further, the strand is required to have rigidity sufficient to ensure proper feed-out thereof to a head without delay in the laminate shaping.

Embodiment (Y)

The laminate shaping support material according to Embodiment (Y) employs a resin composition (Y) which contains a PVA resin, and a block copolymer including a polymer block of an aromatic vinyl compound, at least one of a polymer block of a conjugated diene compound and a block of a hydrogenated conjugated diene compound, and a functional group reactive with a hydroxyl group.

[PVA Resin]

First, the PVA resin to be used in Embodiment (Y) will be described.

The PVA resin is a resin mainly including a vinyl alcohol structural unit and prepared by copolymerizing a vinyl ester monomer and saponifying the resulting polyvinyl ester resin. The PVA resin includes the vinyl alcohol structural unit in a proportion corresponding to a saponification degree, and includes an unsaponified vinyl ester structural unit.

Examples of the vinyl ester monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate and vinyl versatate, among which vinyl acetate is preferably used for economy.

The PVA resin to be used in Embodiment (Y) typically has an average polymerization degree of 150 to 4000, preferably 200 to 2000, particularly preferably 250 to 800, further preferably 300 to 600 (as measured in conformity with JIS K6726).

If the average polymerization degree is excessively low, stable shaping tends to be difficult in the laminate shaping. If the average polymerization degree is excessively high, the resin composition tends to have an excessively high viscosity, making it difficult to perform the melt-forming process.

The viscosity of an aqueous solution of the PVA resin is sometimes employed as an index of the polymerization degree of the PVA resin. The aqueous solution of the PVA resin to be used in Embodiment (Y) typically has a viscosity of 1.5 to 20 mPa·s, preferably 2 to 12 mPa·s, particularly preferably 2.5 to 8 mPa·s. If the viscosity is excessively low, stable shaping tends to be difficult in the laminate shaping. If the viscosity is excessively high, the resin composition tends to have an excessively high viscosity, making it difficult to perform the melt-forming process.

As in Embodiment (X), the viscosity of the aqueous solution of the PVA resin herein means a viscosity of a 4 wt. % aqueous solution of the PVA resin measured at 20° C. in conformity with JIS K6726.

The PVA resin to be used in Embodiment (Y) typically has a saponification degree of not less than 70 mol %, preferably 75 to 99.7 mol %, particularly preferably 85 to 99.5 mol %. If the saponification degree is excessively low, the PVA resin tends to have a reduced affinity for the block copolymer, thereby reducing the shape stability in the laminate shaping.

The saponification degree is measured in conformity with JIS K6726.

The PVA resin typically has a melting point of 120° C. to 230° C., preferably 150° C. to 220° C., particularly preferably 190° C. to 210° C. If the melting point is excessively high, the resin is liable to be deteriorated with the need for increasing the process temperature in the laminate shaping. If the melting point is excessively low, the shape stability tends to be reduced during the laminate shaping.

The main chain of the ordinary PVA resin mainly has 1,3-diol bonds, and the proportion of 1,2-diol bonds in the main chain is about 1.5 to about 1.7 mol %. The proportion of the 1,2-diol bonds, which can be increased by increasing the polymerization temperature for the polymerization of the vinyl ester monomer, is preferably not less than 1.8 mol %, more preferably 2.0 to 3.5 mol % for improvement of the affinity for the block copolymer.

In Embodiment (Y), a PVA resin prepared by copolymerizing a comonomer in the preparation of the vinyl ester resin and saponifying the resulting vinyl ester resin, and a modified PVA resin prepared by introducing a functional group into an unmodified PVA by a post modification reaction are usable as the PVA resin. The modification degree of the PVA resin is generally not greater than 20 mol % so that the PVA resin has sufficient water solubility.

Examples of the comonomer to be used for the copolymerization with the vinyl ester monomer include: olefins such as ethylene, propylene, isobutylene, α-octene, α-dodecene and α-octadecene; unsaturated acids such as acrylic acid, methacrylic acid, crotonic acid, maleic acid, maleic anhydride and itaconic acid, and salts, monoalkyl and dialkyl esters thereof; nitriles such as acrylonitrile and methacrylonitrile; amides such as acrylamide and methacrylamide; olefin sulfonic acids such as ethylene sulfonic acid, allyl sulfonic acid and methallyl sulfonic acid, and salts thereof; alkyl vinyl ethers, N-acrylamide methyl trimethylammonium chloride, allyl trimethylammonium chloride, dimethylallyl vinyl ketone, N-vinylpyrrolidone, vinyl chloride, vinylidene chloride; polyoxyalkylene (meth)allyl ethers such as polyoxyethylene (meth)allyl ethers and polyoxypropylene (meth)allyl ethers; polyoxyalkylene (meth)acrylates such as polyoxyethylene (meth)acrylates and polyoxypropylene (meth)acrylates; polyoxyalkylene (meth)acrylamides such as polyoxyethylene (meth)acrylamides and polyoxypropylene (meth)acrylamides; and hydroxyl group-containing α-olefins such as polyoxyethylene (1-(meth)acrylamide-1,1-dimethylpropyl) esters, polyoxyethylene vinyl ethers, polyoxypropylene vinyl ethers, polyoxyethylene allylamines, polyoxypropylene allylamines, polyoxyethylene vinylamines, polyoxypropylene vinylamines, 3-buten-1-ol, 4-penten-1-ol and 5-hexen-1-ol, and acylation products and other derivatives thereof.

Examples of the PVA resin containing the functional group introduced therein by the post reaction include a PVA resin having an acetoacetyl group introduced therein by a reaction with a diketene, a PVA resin having a polyalkylene oxide group introduced therein by a reaction with ethylene oxide, a PVA resin having a hydroxyalkyl group introduced therein by a reaction with an epoxy compound or the like, and a PVA resin prepared by a reaction with an aldehyde compound having a functional group.

The modification degree of the modified PVA resin, i.e., the proportion of a structural unit derived from the comonomer in the copolymer or the proportion of the functional group introduced in the PVA resin by the post reaction, cannot be uniquely defined because the physical properties of the modified PVA resin significantly differ depending upon the type of the compound to be used for the modification, but the modification degree is typically 0.1 to 20 mol %, particularly preferably 0.5 to 12 mol %.

Among these modified PVA resins, a PVA resin including a structural unit having a primary hydroxyl group at its side chain is preferably used in Embodiment (Y). The number of primary hydroxyl groups is typically 1 to 5, preferably 1 to 2, particularly preferably 1. The PVA resin preferably has a secondary hydroxyl group in addition to the primary hydroxyl group.

Examples of the PVA resin including the structural unit having the primary hydroxyl group at its side chain include a PVA resin including a 1,2-diol structural unit at its side chain, and a PVA resin including a hydroxyalkyl group structural unit at its side chain, among which the PVA resin including the 1,2-diol structural unit at its side chain (hereinafter sometimes referred to simply as "1,2-diol-containing PVA resin" as in Embodiment (X)) is preferred because of its higher affinity for the block copolymer. A PVA resin including a 1,2-diol structural unit represented by the following general formula (1) at its side chain is preferred as the 1,2-diol-containing PVA resin because of a higher reactivity between the hydroxyl group of the block copolymer and the functional group reactive with the hydroxyl group.

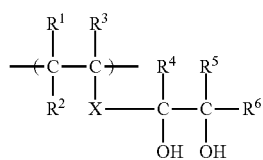

(1)

wherein $R^1$, $R^2$ and $R^3$ are independently each a hydrogen atom or a C1 to C4 alkyl group, X is a single bond or a bonding chain, and $R^4$, $R^5$ and $R^6$ are independently each a hydrogen atom or a C1 to C4 alkyl group.

The proportion (modification ratio) of the 1,2-diol structural unit represented by the general formula (1) for the 1,2-diol-containing PVA resin is typically 0.5 to 12 mol %, preferably 2 to 8 mol %, more preferably 3 to 8 mol %. If the modification ratio is excessively low, the PVA resin tends to have a lower reactivity with the functional group of the block copolymer. If the modification ratio is excessively high, the support material tends to have an excessively low crystallization speed, resulting in deformation during the laminate shaping.

Like an ordinary PVA resin, the 1,2-diol-containing PVA resin includes a vinyl alcohol structural unit and an unsaponified vinyl ester structural unit, in addition to the 1,2-diol structural unit.

In the 1,2-diol structural unit represented by the general formula (1), $R^1$ to $R^3$ and $R^4$ to $R^6$ are preferably all hydrogen atoms with the primary hydroxyl group being present at a side chain terminal for further improvement of the reactivity with the functional group of the block copolymer. However, some of $R^1$ to $R^3$ and $R^4$ to $R^6$ may be substituted with a C1 to C4 alkyl group, as long as the properties of the resin are not significantly impaired. Examples of the C1 to C4 alkyl group include a methyl group, an ethyl group, a n-propyl group, an isopropyl group, a n-butyl group, an isobutyl group and a tert-butyl group, which may have a substituent such as a halogen atom, a hydroxyl group, an ester group, a carboxylic acid group or a sulfonic acid group as required.

In the 1,2-diol structural unit represented by the general formula (1), X is most preferably a single bond for heat stability and stability under higher temperature conditions or acidic conditions, but may be a bonding chain as long as the effects of the present invention are not impaired. Examples of the bonding chain include hydrocarbons such as alkylenes, alkenylenes, alkynylenes, phenylene and naphthylene (which may be substituted with a halogen such as fluorine, chlorine or bromine), —O—, —$(CH_2O)_m$—, —$(OCH_2)_m$—, —$(CH_2O)_mCH_2$—, —CO—, —COCO—, —$CO(CH_2)_m$CO—, —$CO(C_6H_4)CO$—, —S—, —CS—, —SO—, —$SO_2$—, —NR—, —CONR—, —NRCO—, —CSNR—, —NRCS—, —NRNR—, —$HPO_4$—, —$Si(OR)_2$—, —OSi$(OR)_2$—, —$OSi(OR)_2O$—, —$Ti(OR)_2$—, —$OTi(OR)_2$—, —$OTi(OR)_2O$—, —Al(OR)—, —OAl(OR)— and —OAl(OR)O—, wherein Rs are independently each a given substituent, preferably a hydrogen atom or an alkyl group, and m is an integer of 1 to 5. Among these, the bonding chain is preferably an alkylene group having a carbon number of not greater than 6 for stability during production or during use, particularly preferably a methylene group or —$CH_2OCH_2$—.

The production method of the PVA resin having the 1,2-diol structural unit at its side chain is not particularly limited, but preferred examples of the production method include: (i) a method in which a copolymer of a vinyl ester monomer and a compound represented by the following general formula (2) is saponified; (ii) a method in which a copolymer of a vinyl ester monomer and a compound represented by the following general formula (3) is saponified and decarbonated; and (iii) a method in which a copolymer of a vinyl ester monomer and a compound represented by the following general formula (4) is saponified and deketalized. The PVA resin may be produced, for example, by a method described in paragraphs [0014] to [0037] in JP-A-2008-163179.

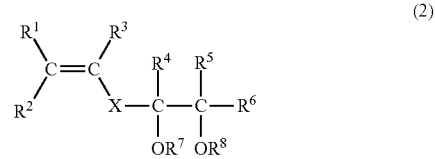

(2)

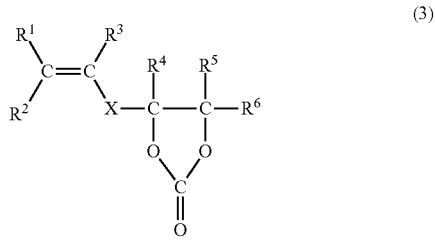

(3)

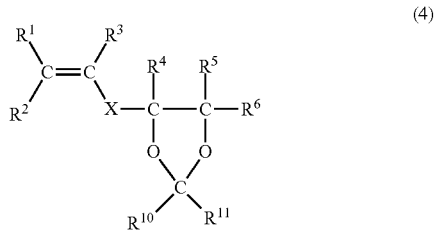

(4)

In the above general formulae (2), (3) and (4), $R^1$, $R^2$, $R^3$, X, $R^4$, $R^5$ and $R^6$ are the same as those for the general formula (1), and $R^7$ and $R^8$ are independently each a hydrogen atom or $R^9$—CO— wherein $R^9$ is a C1 to C4 alkyl group. $R^{10}$ and $R^{11}$ are independently each a hydrogen atom or a C1 to C4 alkyl group.

The PVA resin to be used in Embodiment (Y) may be a single type of PVA resin or a mixture of two or more types of PVA resins. In the latter case, the aforementioned unmodified PVAs may be used in combination, or any of the unmodified PVAs and the PVA resin having the structural unit represented by the above general formula (1) may be used in combination. Further, PVA resins each having the structural unit represented by the above general formula (1) and having different saponification degrees, different polymerization degrees and different modification degrees may be used in combination, or any of the unmodified PVAs or any of the PVA resins having the structural unit represented by the above general formula (1) and other modified PVA resin may be used in combination.

[Block Copolymer]

The support material according to Embodiment (Y) contains the PVA resin and, in addition, the block copolymer including the polymer block of the aromatic vinyl compound, at least one of the polymer block of the conjugated diene compound and the block of the hydrogenated conjugated diene compound, and the functional group reactive with the hydroxyl group.

The block copolymer to be used in Embodiment (Y) will be described.

The block copolymer to be used in Embodiment (Y) includes the polymer block of the aromatic vinyl compound (typified by styrene) as a hard segment, and the polymer block of the conjugated diene compound, a hydrogenated block obtained by hydrogenating some or all of remaining double bonds of the polymer block of the conjugated diene compound or a polymer block of isobutylene as a soft segment.

In Embodiment (Y), the block copolymer particularly preferably has the functional group reactive with the hydroxyl group at its side chain. More specifically, the block copolymer preferably has a carboxylic acid group or a derivative of the carboxylic acid group.

Where the hard segment is expressed by A and the soft segment is expressed by B, the block copolymer may be a diblock copolymer represented by A-B, a triblock copolymer represented by A-B-A or B-A-B, or a polyblock copolymer including segments A and B alternately arranged. The block copolymer may have a straight structure, a branched structure or a star structure. The block copolymer is preferably a straight triblock copolymer represented by A-B-A from the viewpoint of kinetic properties.

Examples of a monomer to be used for formation of the polymer block of the aromatic vinyl compound as the hard segment include styrene; alkylstyrenes such as α-methylstyrene, β-methylstyrene, o-methylstyrene, m-methylstyrene, p-methylstyrene, t-butylstyrene, 2,4-dimethylstyrene and 2,4,6-trimethylstyrene; halogenated styrenes such as monofluorostyrene, difluorostyrene, monochlorostyrene and dichlorostyrene; methoxystyrene; vinyl compounds such as vinylnaphthalene, vinylanthracene, indene and acetonaphthylene having an aromatic ring other than a benzene ring, and their derivatives. The polymer block of the aromatic vinyl compound may be a homopolymer block of a single monomer selected from the aforementioned monomers or a copolymer block of plural monomers selected from the aforementioned monomers. However, a styrene homopolymer block is preferred.

The polymer block of the aromatic vinyl compound may be a copolymer block formed by copolymerization with a small amount of a monomer other than the aromatic vinyl compound, as long as the effects of the present invention are not impaired. Examples of the other monomer include olefins such as butene, pentene and hexene; diene compounds such as butadiene and isoprene; vinyl ether compounds such as methyl vinyl ether; and allyl ether compounds. The copolymerization ratio is typically 10 mol % of the overall polymer block.

The polymer block of the aromatic vinyl compound in the block copolymer typically has a weight average molecular weight of 10,000 to 300,000, particularly preferably 20,000 to 200,000, further preferably 50,000 to 100,000.

Examples of the monomer to be used for formation of the polymer block as the soft segment include conjugated diene compounds such as 1,3-butadiene, isoprene (2-methyl-1,3-butadiene), 2,3-dimethyl-1,3-butadiene and 1,3-pentadiene, and isobutylene, which may be used alone or in combination. The polymer block is preferably a homopolymer block or a copolymer block of isoprene, butadiene and/or isobutylene. Particularly, the polymer block is preferably a homopolymer of butadiene or isobutylene.

The polymer block of the conjugated diene compound has a plurality of bonding arrangements depending upon the polymerization. In the case of butadiene, for example, a butadiene unit having 1,2-bonds ($-CH_2-CH(CH=CH_2)-$) and a butadiene unit having 1,4-bonds ($-CH_2-CH=CH-CH_2-$) are formed. The formation ratio of the diene units varies depending upon the type of the conjugated diene compound, and cannot be uniquely defined. In the case of butadiene, the 1,2-bond formation ratio is typically 20 to 80 mol %.

By hydrogenating some or all of the remaining double bonds of the polymer block of the conjugated diene compound, the heat resistance and the weather resistance of the thermoplastic styrene elastomer can be improved. At this time, the hydrogenation ratio is preferably not less than 50 mol %, particularly preferably not less than 70 mol %.

For example, the hydrogenation converts the butadiene unit having the 1,2-bonds into a butylene unit ($-CH_2-CH(CH_2-CH_3)-$), and converts the butadiene unit having the 1,4-bonds into two continuous ethylene units ($-CH_2-CH_2-CH_2-CH_2-$). Generally, the former unit is preferentially formed.

The polymer block serving as the soft segment may be a copolymer block formed by copolymerization with a small amount of a monomer other than the aforementioned monomers. Examples of the other monomer include aromatic vinyl compounds such as styrene, olefins such as butene, pentene and hexene, vinyl ether compounds such as methyl vinyl ether, and allyl ether compounds. The copolymerization ratio of the other monomer is generally not greater than 10 mol % of the overall polymer block.

The polymer block of the conjugated diene compound or isobutylene in the block copolymer typically has a weight average molecular weight of 10,000 to 300,000, particularly preferably 20,000 to 200,000, further preferably 50,000 to 100,000.

As described above, the block copolymer to be used in Embodiment (Y) of the present invention includes the polymer block of the aromatic vinyl compound as the hard segment, and the polymer block of the conjugated diene compound or the polymer block obtained by hydrogenating some or all of the remaining double bonds of the conjugated diene compound and the polymer block of isobutylene as the soft segment. Typical examples of the block copolymer include a styrene/butadiene block copolymer (SBS) prepared by using styrene and butadiene as ingredients, a styrene/butadiene/butylene block copolymer (SBBS) obtained by hydrogenating side chain double bonds of the butadiene structural unit of the SBS, a styrene/ethylene/butylene block copolymer (SEBS) obtained by hydrogenating main chain double bonds, a styrene/isoprene block copolymer (SIPS) prepared by using styrene and isoprene as ingredients, and a styrene/isobutylene block copolymer (SIBS) prepared by using styrene and isobutylene as ingredients. Particularly, the SEBS and the SIBS are preferably used, which are excellent in heat stability and weather resistance.

The weight ratio between the polymer block of the aromatic vinyl compound serving as the hard segment and the polymer blocks serving as the soft segment in the block copolymer is typically 10/90 to 70/30, particularly preferably 20/80 to 50/50. If the proportion of the polymer block of the aromatic vinyl compound is excessively great or excessively small, the balance between the flexibility and the elasticity of the block copolymer is deteriorated. As a result, the support material is insufficient in peelability and other properties.

The block copolymer can be produced by preparing the block copolymer including the polymer block of the aromatic vinyl compound and the polymer block of the conjugated diene compound or isobutylene and, as required, hydrogenating double bonds of the polymer block of the conjugated diene compound.

A known method may be used for the production of the block copolymer including the polymer block of the aromatic vinyl compound and the polymer block of the conjugated diene compound or isobutylene. For example, the production of the block copolymer may be achieved by sequentially polymerizing the aromatic vinyl compound and the conjugated diene compound or isobutylene in an inactive organic solvent with the use of an alkyllithium compound or the like as an initiator.

A known method may be used for the hydrogenation of the block copolymer including the polymer block of the aromatic vinyl compound and the polymer block of the conjugated diene compound. For example, the hydrogenation may be achieved by using a reducing agent such as a hydrogenated boron compound, or by using a metal catalyst such as platinum, palladium or Raney nickel for hydrogen reduction.

A characteristic feature of the present invention is that the block copolymer to be used in Embodiment (Y) has the functional group reactive with the hydroxyl group at its side chain. The functional group is preferably a carboxylic acid. The support material produced by using the block copolymer having the functional group reactive with the hydroxyl group at its side chain is excellent particularly in peelability and forming stability.

The amount of the carboxylic acid to be contained in the block copolymer is typically 0.5 to 20 mg $CH_3ONa/g$, particularly preferably 1 to 10 mg $CH_3ONa/g$, further preferably 1.5 to 3 mg $CH_3ONa/g$, which is measured as acid value by a titration method.

If the acid value is excessively low, it will be impossible to sufficiently provide the effect of introducing the functional group into the block copolymer. If the acid value is excessively high, the support material tends to have an excessively high melt viscosity due to a crosslinking reaction.

A known method may be used for the introduction of the carboxylic acid-containing functional group into the block copolymer. Preferred examples of the method include a method in which an α,β-unsaturated carboxylic acid or its derivative is copolymerized in the production of the block copolymer (i.e., during the copolymerization), and a method in which an α,β-unsaturated carboxylic acid or its derivative is added to the block copolymer after the production of the block copolymer. Specific examples of the addition method include a method in which the addition is achieved by a radical reaction in a solution in the presence or absence of a radical initiator, and a method in which the block copolymer and the α,β-unsaturated carboxylic acid or its derivative are melt-kneaded in an extruder.

Examples of the α,β-unsaturated carboxylic acid or its derivative to be used for the introduction of the carboxylic acid group include β-unsaturated monocarboxylic acids such as acrylic acid and methacrylic acid; α,β-unsaturated dicarboxylic acids such as maleic acid, succinic acid, itaconic acid and phthalic acid; and α,β-unsaturated monocarboxylic acid esters such as glycidylacrylate, glycidyl methacrylate, hydroxyethyl acrylate and hydroxymethyl methacrylate. In Embodiment (Y) of the present invention, adjacent carboxylic acid groups introduced into the block copolymer may form an acid anhydride structure. Examples of the acid anhydride structure include α,β-unsaturated dicarboxylic acid anhydrides such as maleic anhydride, succinic anhydride, itaconic anhydride and phthalic anhydride.

The block copolymer to be used in Embodiment (Y) typically has a weight average molecular weight of 50,000 to 500,000, particularly preferably 120,000 to 450,000, further preferably 150,000 to 400,000.

If the weight average molecular weight is excessively great or excessively small, or if the melt viscosity to be described below is excessively high or excessively low, the resin composition fails to have homogenous morphology with the block copolymer homogeneously dispersed in the PVA resin and, therefore, tends to have poorer mechanical properties.

The weight average molecular weight of the block copolymer is measured by a gel permeation chromatography (GPC) based on a polystyrene calibration standard.

The block copolymer typically has a melt viscosity of 100 to 3000 mPa·s, particularly preferably 300 to 2000 mPa·s, further preferably 800 to 1500 mPa·s, as measured at 220° C. with a shearing speed of 122 $sec^{-1}$.

In Embodiment (Y), the block copolymer may include a single type of block copolymer, or may include plural types of block copolymers in order to impart the resin composition with desired properties.

Commercially available examples of the block copolymer having the reactive functional group include TOUGHTECH M series (carboxyl group-modified SEBS) available from Asahi Kasei Corporation, f-DYNARON available from JSR Corporation, and KRATON FG available from Shell Japan Co.

[Laminate Shaping Support Material According to Embodiment (Y)]

The laminate shaping support material according to Embodiment (Y) contains the PVA resin and the block copolymer. The proportion of the PVA resin is preferably 50 to 95 wt. %, more preferably 60 to 90 wt. %, particularly preferably 65 to 75 wt %, based on the total weight of the PVA resin and the block copolymer in the support material. If the proportion is less than 50 wt. %, the support material tends to have a reduced water solubility. If the proportion is greater than 95 wt. %, the support material tends to have a reduced flexibility.

The proportion of the PVA resin is 50 to 95 wt. %, preferably 60 to 90 wt. %, particularly preferably 70 to 80 wt. %, based on the overall weight of the support material. If the proportion is excessively small, the support material tends to have a significantly reduced water solubility. If the proportion is excessively great, the support material tends to have an insufficient flexibility.

The proportion of the block copolymer is preferably 5 to 50 wt. %, more preferably 10 to 40 wt. %, particularly preferably 25 to 35 wt %, based on the total weight of the PVA resin and the block copolymer. If the proportion is less than 5 wt. %, the support material tends to have an insufficient flexibility. If the proportion is greater than 50 wt. %, the support material tends to have poorer forming stability with an excessively high melt viscosity.

The proportion of the block copolymer is 5 to 50 wt. %, preferably 10 to 40 wt. %, particularly preferably 20 to 30 wt. %, based on the overall weight of the support material. If the proportion is excessively small, the support material tends to have an insufficient flexibility. If the proportion is excessively great, the support material tends to have poorer forming stability.

Since the support material is fed in the form of a strand to a head of the laminate shaping apparatus, the support material preferably has a proper rigidity for smooth feeding thereof. Further, the strand of the support material is often fed through a tube to the head of the laminate shaping apparatus. Therefore, the support material preferably has a surface highly slidable with respect to an interior surface of the tube. Accordingly, the surface of the support material is preferably smooth and free from tackiness for the smooth feeding of the strand of the support material to the head of the laminate shaping apparatus. In general, a strand surface of the PVA resin is highly hygroscopic and hence liable to be tacky. Therefore, a filler is preferably added to the support material in order to impart the strand of the support material with proper rigidity and to suppress the tackiness of the strand.

The filler may be an organic filler or an inorganic filler. For excellent heat stability, the inorganic filler is preferred. Examples of the inorganic filler include oxides, hydroxides, carbonates, sulfates, silicates, nitrides, carbon compounds and metals, among which the silicates are preferred because they have no adverse influence on the heat stability of the support material. Examples of the silicates include calcium silicate, talc, clay, mica, montmorillonite, bentonite, activated clay, sepiolite, imogolite, sericite, glass fibers, glass beads and silica balloons, among which the talc is preferred because it improves the surface smoothness of the support material and alleviates the tackiness of the support material. The filler preferably has a particle size of 0.5 to 500 μm, more preferably 50 to 400 μm, particularly preferably 100 to 300 μm. The talc preferably has a particle size of 0.5 to 10 μm, more preferably 1 to 5 μm, particularly preferably 2 to 3 μm. If the particle size is excessively small, it will be difficult to knead the filler in the resin. If the particle size is excessively great, the support material tends to have a rough surface and a lower strength. Industrially preferred examples of the filler include SG-95 and SG-200 available from Nippon Talc Co., Ltd., and LSM-400 available from Fuji Talc Industrial Co., Ltd. The particle size herein means a particle diameter D50 measured by a laser diffraction method. The proportion of the filler is preferably 1 to 40 wt. %, more preferably 2 to 30 wt. %, particularly preferably 3 to 10 wt. %, based on the weight of the support material. If the proportion of the filler is excessively small, the effect of the addition of the filler cannot be provided. If the proportion of the filler is excessively great, the strand of the support material tends to have a reduced surface smoothness and a reduced flexibility.

The support material may contain a plasticizer. In Embodiment (Y), however, the proportion of the plasticizer is preferably minimized in order to improve the forming stability of the support material, and is preferably not greater than 20 wt. %, more preferably not greater than 10 wt. %, further preferably not greater than 1 wt. %, particularly preferably not greater than 0.1 wt. %.

In addition to the aforementioned ingredients, as required, known additives such as an antioxidant, a colorant, an antistatic agent, a UV absorber and a lubricant, and other thermoplastic resin may be added to the resin composition. Specific examples of the other thermoplastic resin include olefin homopolymers and copolymers such as linear low-density polyethylenes, low-density polyethylenes, medium-density polyethylenes, high-density polyethylenes, ethylene-vinyl acetate copolymers, ionomers, ethylene-propylene copolymers, ethylene-α-olefin (C4 to C20 α-olefin) copolymers, ethylene-acrylate copolymers, polypropylenes, propylene-α-olefin (C4 to C20 α-olefin) copolymers, polybutenes and polypentenes, polycycloolefins, polyolefin resins in a broader sense such as obtained by graft-modifying any of these olefin homopolymers and copolymers with an unsaturated carboxylic acid or an unsaturated carboxylate, polystyrene resins, polyesters, polyamides, copolymerized polyamides, polyvinyl chlorides, polyvinylidene chlorides, acrylic resins, vinyl ester resins, polyurethane elastomers, chlorinated polyethylenes and chlorinated polypropylenes.

As in Embodiment (X), the production method of the support material to be used for the laminate shaping includes the steps of mixing the aforementioned ingredients in predetermined proportions, kneading the resulting mixture in a melted state with heating, extruding the mixture into a strand, cooling the strand and winding the strand around a reel. More specifically, the ingredients are fed as a mixture or separately into a single screw or multi-screw extruder, heat-melted and kneaded, and extruded from a single-hole or multi-hole strand die into a 1.5- to 3.0-mm diameter strand, which is in turn cooled with air or with water to be solidified and then wound around the reel. The strand is required to have a stable diameter and have flexibility and toughness sufficient to prevent breakage even if being wound around the reel. Further, the strand is required to have rigidity sufficient to ensure proper feed-out thereof to the head without delay in the laminate shaping.

[Laminate-Shaped Product Production Method and Laminate-Shaped Product]

A laminate-shaped product production method employing the inventive support material will be described.

A known laminate shaping apparatus may be used as the laminate shaping apparatus for the laminate shaping, as long as the apparatus includes a plurality of heads respectively adapted to extrude the model material and the support material and is capable of performing a fusion laminate shaping process. Examples of the laminate shaping apparatus include dual head type laminate shaping apparatuses such as CREATOR available from Flashforge Co., Ltd., EAGLEED available from Reis Enterprise Co., Ltd., MBOT Grid II available from 3D Systems Corporation and UPRINT SE available from Stratasys Ltd. Exemplary materials to be used as the model material for forming a three-dimensional product include various resins such as acrylonitrile butadiene styrene (ABS) resins, polylactic acids, polystyrenes, polyamides and polyethylenes, among which the ABS resins are mainly used from the viewpoint of melt-formability, heat stability and mechanical properties after solidification. The support material is required to have excellent adhesiveness to the ABS resins.

Like the support material, the model material is formed into a strand, which is in turn wound around a reel. The strands of the model material and the support material are respectively fed to separate heads of the laminate shaping apparatus, melted in the heads with heating, and applied in a fluid state onto a stage from separate nozzles to be pressed against the stage and laid one over another. The melting temperatures in the heads are typically 150° C. to 220° C., and the extruding pressures are typically 200 to 1000 psi. The laminating pitch is typically 200 to 350 μm.

A laminate thus formed from the support material and the model material is cooled to be solidified, and then the support material is removed from the laminate, whereby the intended laminate-shaped product is produced. For example, the inventive support material is dissolved away in water. To dissolve away the support material, the laminate may be immersed in water or hot water contained in a container, or the support material may be washed away from the laminate with running water. Where the dissolution of the support material is achieved by immersing the laminate in water, it is preferred to stir the water or apply ultrasonic waves to the water in order to reduce the dissolution process time. The temperature of the water is preferably about 25° C. to about 80° C. The weight of the water or the hot water to be used for the dissolution of the support material is about 10 to about 10000 times the weight of the support material. A characteristic feature of the inventive support material is that the support material can be easily dissolved away in water at a relatively low temperature.

EXAMPLES

The present invention will hereinafter be described more specifically by way of examples thereof. It should be understood that the present invention be not limited to these examples within the scope of the invention. In the examples, the term "part(s)" means part(s) by weight.

Examples of Embodiment (X)

Example 1

(i) Preparation of 1,2-Diol-Containing PVA Resin (1)

In a reaction vessel provided with a reflux condenser, a dropping funnel and a stirrer, 10% of 68.5 parts of vinyl acetate and 20.5 parts of methanol were first fed, and the rest of the vinyl acetate and 11.0 parts (7.2 mol % with respect to the amount of vinyl acetate to be fed) of 3,4-diacetoxy-1-butene were fed dropwise at constant rates in 9 hours. Then, 0.3 mol % (with respect to the amount of the fed vinyl acetate) of azobisisobutyronitrile was fed into the reaction vessel. In turn, the temperature was raised while the resulting mixture was stirred in a nitrogen stream, thereby initiating polymerization. When the polymerization degree of vinyl acetate reached 90%, a predetermined amount of m-dinitrobenzene was added to the reaction vessel to terminate the polymerization. Subsequently, methanol vapor was blown into the reaction vessel, whereby unreacted vinyl acetate monomer was removed out of the reaction vessel. Thus, a copolymer was prepared in the form of a methanol solution.

The methanol solution was further diluted with methanol to a concentration of 45 wt. %, and fed into a kneader. Then, a methanol solution of sodium hydroxide having a sodium concentration of 2 wt. % was added in a proportion of 10.5 mmol based on a total amount of 1 mol of a vinyl acetate structural unit and a 3,4-diacetoxy-1-butene structural unit of the copolymer with the solution temperature kept at 35° C., and the copolymer was saponified for 4 hours. As the saponification proceeded, a saponification product was precipitated. When the saponification product was obtained in a particulate form, the saponification product was separated by a solid/liquid separation process. The resulting saponification product was thoroughly rinsed with methanol, and dried at 70° C. for 12 hours in a hot air dryer. Thus, an intended 1,2-diol-containing PVA resin (1) was prepared.

The 1,2-did-containing PVA resin (1) thus prepared had a saponification degree of 99.0 mol % as determined by measuring an alkali consumption required for hydrolysis of vinyl acetate remaining in the resin and the structural unit of 3,4-diacetoxy-1-butene. The PVA resin (1) had an average polymerization degree of 360 as determined by analysis in conformity with JIS K6726, and a melting point of 175° C. as measured by a differential thermal analyzer DSC. The content of the 1,2-diol structural unit represented by the formula (1) was 7.2 mol % as calculated from an integration value measured by $^1$H-NMR (300 MHz proton NMR using a d6-DMSO solution and an internal standard of tetramethylsilane at 50° C.)

The PVA resin (1) had a heat ($\Delta$H) of fusion of 21.5 J/g at its melting point as measured by means of a Perkin-Elmer's input compensation type differential scanning calorimeter "Diamond DSC" by sealing 5 mg of a sample in a measurement pan, increasing the temperature at a temperature increase rate of 10° C./min from −30° C. to 215° C., immediately thereafter reducing the temperature at a temperature decrease rate of 10° C./min to −30° C. and increasing the temperature again at a temperature increase rate of 10° C./min to 230° C.

(ii) Production of Support Material

The 1,2-diol-containing PVA resin (1) was fed into a twin screw extruder, melted and kneaded under the following conditions and extruded into a strand having a diameter of 1.75 mm, and the strand was cooled on a belt and wound around a reel. Thus, a support material was produced. The support material was evaluated in the following manner. The results of the evaluation are shown in Table 1.
Extruder: Available from Technovel Corporation, and having a diameter of 15 mm and an L/D ratio of L/D=60
Extruding temperature: C1/C2/C3/C4/C5/C6/C7/C8/D=150° C./170° C./180° C./190° C./200° C./210° C./230° C./230° C./230° C.
Rotation speed: 200 rpm
Discharge amount: 1.5 kg/hour (iii) Evaluation of Support Material

[Shape Stability]
A plate of the support material was prepared by means of an injection molding machine PS60E12ASE available from Nissei Ltd. by using a plate mold having a size of 5.0×2.5 cm and a thickness of 2 mm and employing an injection temperature of 210° C., an injection speed of 50%, an injection pressure of 60%, a mold temperature of 70° C. and a cooling period of 30 seconds. The plate was placed on a hot plate at 80° C. to be heated. After 3.0 g of an ABS resin TOYORAC Grade 600-309 available from Toray Corporation was extruded in a melted state onto the support material plate at 230° C. at a discharge rate of 0.5 kg/hour by means of a 15=1) single screw extruder, the support material plate was removed from the hot plate and sufficiently cooled in a 25° C. atmosphere. When the ABS resin was thereafter peeled off from the support material plate, the state of the surface of the plate was visually checked, and rated based on the following criteria:
Excellent (∘∘): The plate was not deformed at all.
Acceptable (∘): The plate was slightly deformed.
Unacceptable (x): The plate was apparently deformed.
[Adhesiveness to Model Material]
An ABS resin TOYORAC Grade 600-309 available from Toray Corporation was extruded to be formed into a single layer film having a thickness of 30 μm, and the support material was laid over the single layer film to a thickness of 5 μm under the following conditions by an extrusion coating method. The resulting double layer film was cut to a width of 15 mm, and a T-peeling test was performed on the resulting strip at a peeling rate of 100 mm/min in conformity with JIS K6854-3 for evaluation of the support material for adhesiveness. Extruder: Available from Technovel Corporation, and having a diameter of 15 mm and an L/D ratio of L/D=60

Die: A 30-cm width coat hanger die having a lip opening size of 0.35 mm

Extruding temperature: C1/C2/C3/C4/C5/C6/C7/C8/D=150° C./170° C./180° C./190° C./200° C./210° C./230° C./230° C./230° C. Discharge amount: 0.5 kg/hour

Example 2

(i) Preparation of 1,2-Diol-Containing PVA Resin (2)

In substantially the same manner as in Example 1, 40% of 72.1 parts of vinyl acetate and 21.6 parts of methanol were first fed in a reaction vessel, and the rest of the vinyl acetate and 6.3 parts of 3,4-diacetoxy-1-butene were fed dropwise at constant rates in 8 hours. Then, 0.16 mol % (with respect to the amount of the fed vinyl acetate) of azobisisobutyronitrile was fed in the reaction vessel. In turn, the temperature was raised while the resulting mixture was stirred in a nitrogen stream, thereby initiating polymerization. When the polymerization degree of vinyl acetate reached 90%, a predetermined amount of m-dinitrobenzene was added to the reaction vessel to terminate the polymerization. Subsequently, methanol vapor was blown into the reaction vessel, whereby unreacted vinyl acetate monomer was removed out of the reaction vessel. Thus, a copolymer was prepared in the form of a methanol solution.

The methanol solution was further diluted with methanol to a concentration of 55 wt. %, and fed into a kneader. Then, a methanol solution of sodium hydroxide having a sodium concentration of 2 wt. % was added in a proportion of 3.0 mmol based on a total amount of 1 mol of a vinyl acetate structural unit and a 3,4-diacetoxy-1-butene structural unit of the copolymer with the solution temperature kept at 35° C., whereby the copolymer was saponified. As the saponification proceeded, a saponification product was precipitated. When the saponification product was obtained in a particulate form, the saponification product was separated by a solid/liquid separation process. The resulting saponification product was thoroughly rinsed with methanol, and dried in a hot air dryer. Thus, an intended 1,2-diol-containing PVA resin (2) was prepared.

The 1,2-diol-containing PVA resin (2) thus prepared had a saponification degree of 78.0 mol %, an average polymerization degree of 450, a 1,2-diol structural unit content of 4.5 mol %, a melting point of 143° C., and a heat (ΔH) of fusion of 14.3 J/g.

In the same manner as in Example 1, the 1,2-diol-containing PVA resin (2) thus prepared was kneaded by means of a twin screw extruder, and formed into a strand-shaped support material, which was in turn evaluated.

Comparative Example 1

(i) Preparation of 1,2-Diol-Containing PVA Resin (3)

In a reaction vessel provided with a reflux condenser, a dropping funnel and a stirrer, 27.1 parts (40 wt. % of the total feed amount) of vinyl acetate, 14.2 parts of methanol and 7.2 parts (40 wt. % of the total feed amount) of 3,4-diacetoxy-1-butene were first fed, and then 0.06 mol % (with respect to the amount of the fed vinyl acetate) of azobisisobutyronitrile was fed. In turn, the temperature was raised while the resulting mixture was stirred in a nitrogen stream, thereby initiating polymerization.

Further, 40.7 parts (60 wt. % of the total feed amount) of vinyl acetate and 10.8 parts (60 wt. % of the total feed amount) of 3,4-diacetoxy-1-butene were fed dropwise at constant rates in the reaction vessel in 15 hours, during which 0.04 mol % (with respect to the amount of the fed vinyl acetate) of azobisisobutyronitrile was additionally fed dividedly in two parts into the reaction vessel and the polymerization was continued. When the polymerization degree of vinyl acetate reached 90%, a predetermined amount of m-dinitrobenzene was added to the reaction vessel to terminate the polymerization. Subsequently, methanol vapor was blown into the reaction vessel, whereby unreacted vinyl acetate was removed out of the reaction vessel. Thus, a copolymer was prepared in the form of a methanol solution.

Then, the methanol solution was further diluted with methanol to a concentration of 55 wt. %, and fed into a kneader. Then, a methanol solution of sodium hydroxide having a sodium concentration of 2 wt. % was added in a proportion of 3.5 mmol based on a total amount of 1 mol of a vinyl acetate structural unit and a 3,4-diacetoxy-1-butene structural unit of the copolymer with the solution temperature kept at 35° C., whereby the copolymer was saponified. As the saponification proceeded, a saponification product was precipitated. When the saponification product was obtained in a particulate form, the saponification product was filtered out. The resulting saponification product was thoroughly rinsed with methanol, and dried in a hot air dryer. Thus, an intended 1,2-diol-containing PVA resin (3) was prepared.

The 1,2-diol-containing PVA resin (3) thus prepared had a saponification degree of 88.0 mol % as determined by measuring an alkali consumption required for hydrolysis of remaining vinyl acetate and 3,4-diacetoxy-1-butene. Further, the PVA resin (3) had an average polymerization degree of 450 as determined by analysis in conformity with JIS K6726, and a 1,2-diol structural unit content of 12 mol %.

Measurement was performed on the thus prepared 1,2-diol-containing PVA resin (3) by means of a differential scanning calorimeter, and it was found that the 1,2-diol-containing PVA resin (3) was an amorphous polymer having no melting point peak without heat of fusion. In the same manner as in Example 1, the resin was kneaded by means of a twin screw extruder, and formed into a strand-shaped support material, which was in turn evaluated.

The evaluation results are also shown in Table 1.

TABLE 1

|  | Example 1 | Example 2 | Comparative Example 1 |
|---|---|---|---|
| PVA resin | | | |
| Type of PVA | PVA (1) | PVA (2) | PVA (3) |
| Amount (mol %) of 1,2-diol | 7.2 | 4.5 | 12 |
| Polymerization degree | 360 | 450 | 450 |
| Saponification degree (mol %) | 99 | 78 | 88 |
| ΔH (J/g) | 21.5 | 14.3 | N.D. |
| Acid-modified SEBS | Not contained | Not contained | Not contained |
| Evaluation | | | |
| Shape stability | ⊙⊙ | ◯ | x |
| Adhesiveness to model material | 410 mN/15 mm | 160 mN/15 mm | 30 mN/15 mm |

As apparent from the above results, the support materials each including a 1,2-diol-containing PVA resin having a heat ΔH of fusion falling within the specific range are more excellent in shape stability and more useful, with an adhesive force of higher than 100 mN/15 mm with respect to the model material, than the support material (Comparative Example 1) including a 1,2-diol-containing PVA resin having a heat ΔH of fusion falling outside the specific range.

Example 3

First, 70 parts of the 1,2-diol-containing PVA resin (1) prepared in Example 1 and 30 parts of a styrene/ethylene/butylene block copolymer (SEGS) having a carboxyl group (TOUGHTECH M1911 available from Asahi Kasei Corporation and having an acid value of 2 mg $CH_3ONa/g$) as a block copolymer were dry-blended. Then, the resulting mixture was fed into a twin screw extruder and melt-kneaded. The resulting resin composition was extruded into a strand having a diameter of 1.75 mm, and the strand was cooled on a belt with air and wound around a reel. Thus, a support material was produced, and evaluated in the aforementioned manner. The results of the evaluation are shown in Table 2.

Example 4

First, 70 parts of the 1,2-diol-containing PVA resin (2) prepared in Example 2 and 30 parts of a styrene/ethylene/butylene block copolymer (SEGS) having a carboxyl group (TOUGHTECH M1911 available from Asahi Kasei Corporation and having an acid value of 2 mg $CH_3ONa/g$) as a block copolymer were dry-blended. Then, a support material was produced and evaluated in the same manner as in Example 3.

The results of the evaluation are shown in Table 2.

TABLE 2

| | Example 3 | Example 4 |
|---|---|---|
| PVA resin | | |
| Type of PVA | PVA (1) | PVA (2) |
| Amount (mol %) of 1,2-diol | 7.2 | 4.5 |
| Polymerization degree | 360 | 450 |
| Saponification degree (mol %) | 99 | 78 |
| ΔH (J/g) | 21.5 | 14.3 |
| Acid-modified SEBS | Contained | Contained |
| Evaluation | | |
| Shape stability | ∘∘ | ∘ |
| Adhesiveness to model material | 560 mN/15 mm | 630 mN/15 mm |

As apparent from the above results, the support materials each including a 1,2-diol-containing PVA resin having a heat ΔH of fusion falling within the specific range are excellent in shape stability and useful with an adhesive force of higher than 300 mN/15 mm with respect to the model material.

Examples of Embodiment (Y)

Example 5

(i) Preparation of PVA Resin (5)

In a reaction can provided with a reflux condenser, a dropping funnel and a stirrer, 100 parts of vinyl acetate and 100 parts of methanol were first fed, and 0.15 mol % (with respect to the amount of the fed vinyl acetate) of azobisisobutyronitrile was fed. Then, the temperature was raised while the resulting mixture was stirred in a nitrogen stream, thereby initiating polymerization. After a lapse of 5 hours from the initiation of the polymerization, 0.05 mol % of azobisisobutyronitrile was added to the reaction can. When the polymerization degree of vinyl acetate reached 85%, a predetermined amount of m-dinitrobenzene was added to the reaction can to terminate the polymerization. Subsequently, methanol vapor was blown into the reaction can to be distilled, whereby unreacted vinyl acetate monomer was removed out of the reaction can. Thus, a copolymer was prepared in the form of a methanol solution.

Subsequently, the solution was further diluted with methanol to a concentration of 50 wt. %, and fed into a kneader. Then, a methanol solution of sodium hydroxide having a sodium concentration of 2 wt. % was added in a proportion of 4.3 mmol based on 1 mol of a vinyl acetate structural unit of the copolymer with the solution temperature kept at 35° C., whereby the copolymer was saponified. As the saponification proceeded, a saponification product was precipitated. When the saponification product was obtained in a particulate form, 1.0 equivalent of sodium hydroxide containing acetic acid for neutralization was added to the reaction can. Then, the resulting saponification product was filtered out, thoroughly rinsed with methanol, and dried in a hot air dryer. Thus, an intended PVA resin (5) was prepared.

The PVA resin (5) thus prepared had a saponification degree of 88 mol % as determined by measuring an alkali consumption required for hydrolysis of remaining vinyl acetate, and an average polymerization degree of 500 as determined by analysis in conformity with JIS K6726.

(ii) Production of Support Material

First, 70 parts of the PVA resin (5) and 30 parts of a styrene/ethylene/butylene block copolymer (SEBS) having a carboxylic acid group (TOUGHTECH M1911 available from Asahi Kasei Corporation and having an acid value of 2 mg $CH_3ONa/g$) as a block polymer were dry-blended. Then, the resulting mixture was fed into a twin screw extruder, and melt-kneaded under the following conditions. The resulting resin composition was extruded into a strand having a diameter of 1.75 mm, and the strand was cooled on a belt with air and wound around a reel. Thus, a support material was produced, and evaluated in the aforementioned manner. The results of the evaluation are shown in Table 3. Extruder: Available from Technovel Corporation, and having a diameter of 15 mm and an L/D ratio of L/D=60 Extruding temperature: C1/C2/C3/C4/C5/C6/C7/C8/D=150° C./170° C./180° C./190° C./200° C./210° C./220° C./220° C./220° C. Rotation speed: 200 rpm Discharge amount: 1.5 kg/hour (iii) Evaluation of Support Material

[Peelability]

It is important that the support material is not torn off even if being stretched for peeling thereof. It is considered that a support material having a higher breaking stress has a higher toughness.

After the laminate shaping with the use of the support material, the support material is peeled off from a shaped product of a model material. Without sufficient flexibility, however, the support material cannot be properly peeled off from the shaped product of the model material. Without sufficient toughness, the support material will be torn off when being stretched for peeling thereof. Therefore, the support material cannot be efficiently peeled off. Thus, the support material is required to have flexibility and toughness for proper peelability. For this reason, flexibility evaluation and toughness evaluation were performed in the following manner:

<Flexibility Evaluation>

A strand of the support material maintained in a dry state was cut to 30 cm, and bent around a cylindrical iron rod having a diameter of 5 cm with a 10-cm long end portion thereof left. It was checked whether or not the strand was broken until it was wound around the rod once. This operation was performed on 5 strands, and the support material was evaluated based on the following criteria:
Good (○): Not more than 1 strand was broken.
Acceptable (A): 2 to 4 strands were broken.
Unacceptable (x): All the 5 strands were broken.

<Toughness Evaluation>

A strand of the support material maintained in a dry state was cut to 10 cm, and a tensile test was performed on the cut strand by means of a tensile tester by stretching the strand at a stretching speed of 10 mm/min with a gage distance of 30 mm. At this time, the breaking stress was determined.

[Forming Stability]

The diameters of the produced strand were measured at ten points spaced 20 cm from each other by means of a caliper, and an average strand diameter was calculated. Where the cross section of the strand was not a perfect circle, the greatest diameter was measured. The strand was evaluated based on the following criteria indicating the relationship between the calculated average diameter and the diameters measured at 10 points.
Excellent (○○): All the measured diameters fell within a range of the average diameter±0.05 mm.
Good (○): One or more of the measured diameters fell outside the range of the average diameter±0.05 mm, and all the measured diameters fell within a range of the average diameter±0.15 mm.
Acceptable (A): One or more of the measured diameters fell outside the range of the average diameter±0.15 mm, and all the measured diameters fell within a range of the average diameter±0.25 mm.
Unacceptable (x): One or more of the measured diameters fell outside the range of the average diameter±0.25 mm.

The support material is extruded in a melted state from a nozzle for shaping. If the diameter of the support material extruded from the nozzle is unstable, however, the shaping is not stabilized, making it impossible to shape an intended product with higher reproducibility. Since the strand of the support material is formed by extrusion in the melted state, the stable diameter of the strand means that the support material is stably extruded in the laminate shaping. Therefore, the support material that ensures the production of the shaped product with higher reproducibility is excellent in forming stability in the production of the strand with a stable strand diameter.

[Smoothness of Strand]

The surface of the strand of the support material prepared in the aforementioned manner was visually and tactilly evaluated based on the following criteria:
Excellent (○○): The surface was smooth, and free from tackiness.
Good (○): The surface was smooth and tacky.
Acceptable (A): The surface was slightly rough and tacky.
Unacceptable (x): The surface was very rough.

Example 6

A PVA resin (6) having a saponification degree of 72 mol % was prepared in substantially the same manner as in Example 5 by reducing the saponification period. Then, a support material was produced and evaluated in the same manner.

Example 7

A support material was produced in substantially the same manner as in Example 5, except that 85 parts of the PVA resin (5) and 15 parts of the block copolymer were kneaded and extruded. Then, the support material was evaluated in the same manner.

Example 8

The support material was produced in substantially the same manner as in Example 7, except that 15 parts of TOUGHTECH M1913 (available from Asahi Kasei Corporation and having an acid value of 10 mg $CH_3ONa/g$) was used as the block copolymer.

Example 9

(i) Preparation of 1,2-Diol-Containing PVA Resin (7)

In a reaction can provided with a reflux condenser, a dropping funnel and a stirrer, 68.0 parts of vinyl acetate, 23.8 parts of methanol and 8.2 parts of 3,4-diacetoxy-1-butene were first fed, and then 0.3 mol % (with respect to the amount of the fed vinyl acetate) of azobisisobutyronitrile was fed. In turn, the temperature was raised while the resulting mixture was stirred in a nitrogen stream, thereby initiating polymerization. When the polymerization degree of vinyl acetate reached 90%, a predetermined amount of m-dinitrobenzene was added to the reaction can to terminate the polymerization. Subsequently, methanol vapor was blown into the reaction can, whereby unreacted vinyl acetate monomer was removed out of the reaction can. Thus, a copolymer was prepared in the form of a methanol solution.

Then, the methanol solution was further diluted with methanol to a concentration of 55 wt. %, and fed into a kneader. Then, a methanol solution of sodium hydroxide having a sodium concentration of 2 wt. % was added in a proportion of 3.5 mmol based on a total amount of 1 mol of a vinyl acetate structural unit and a 3,4-diacetoxy-1-butene structural unit of the copolymer with the solution temperature kept at 35° C., whereby the copolymer was saponified. As the saponification proceeded, a saponification product was precipitated. When the saponification product was obtained in a particulate form, the saponification product was separated by a solid/liquid separation process. The resulting saponification product was thoroughly rinsed with methanol, and dried in a hot air dryer. Thus, an intended 1,2-diol-containing PVA resin (7) was prepared.

The 1,2-diol-containing PVA resin (7) thus prepared had a saponification degree of 88.0 mol %, and a polymerization degree of 450. The content of the 1,2-diol structural unit represented by the above formula was 6 mol % as calculated from an integration value measured by $^1$H-NMR (300 MHz proton NMR using a d6-DMSO solution and an internal standard of tetramethylsilane at 50° C.).

A support material was produced in substantially the same manner as in Example 5, except that the 1,2-diol-containing PVA resin (7) was used instead of the PVA resin (5). Then, the support material was evaluated.

Example 10

(i) Preparation of 1,2-Diol-Containing PVA Resin (8)

In a reaction can provided with a reflux condenser, a dropping funnel and a stirrer, 85 g of vinyl acetate (equivalent to an initial feed amount of 10 wt. % of the total feed amount), 460 g of methanol and 13.6 g (7.2 mol % with respect to the amount of the fed vinyl acetate) of 3,4-diacetoxy-1-butene were first fed, and then 0.2 mol % (with respect to the amount of the fed vinyl acetate) of azobisisobutyronitrile was fed. In turn, the temperature was raised while the resulting mixture was stirred in a nitrogen stream, thereby initiating polymerization. After a lapse of 0.5 hours from the initiation of the polymerization, vinyl acetate (90 wt. % of the total feed amount) was added dropwise to the reaction can (at a dropping speed of 95.6 g/hr) in 8 hours. After lapses of 2.5 hours and 4.5 hours from the initiation of the polymerization, 0.1 mol % of azobisisobutyronitrile was added to the reaction can. When the polymerization degree of vinyl acetate reached 85%, a predetermined amount of m-dinitrobenzene was added to the reaction can to terminate the polymerization. Subsequently, methanol vapor was blown into the reaction can to be distilled, whereby unreacted vinyl acetate monomer was removed out of the reaction can. Thus, a copolymer was prepared in the form of a methanol solution.

Then, the methanol solution was further diluted with methanol to a concentration of 50 wt. %, and fed into a kneader. Then, a methanol solution of sodium hydroxide having a sodium concentration of 2 wt. % was added in a proportion of 9 mmol based on a total amount of 1 mol of a vinyl acetate structural unit and a 3,4-diacetoxy-1-butene structural unit of the copolymer with the solution temperature kept at 35° C., whereby the copolymer was saponified. As the saponification proceeded, a saponification product was precipitated. When the saponification product was obtained in a particulate form, the 2 wt. % sodium hydroxide methanol solution was added in a proportion of 4 mmol based on a total amount of 1 mol of the vinyl acetate structural unit and the 3,4-diacetoxy-1-butene structural unit, whereby the saponification further proceeded. Thereafter, acetic acid was added in an amount of 0.8 equivalents based on the amount of the sodium hydroxide for neutralization. Then, the resulting saponification product was filtered off, thoroughly rinsed with methanol, and dried in a hot air dryer. Thus, an intended PVA resin (8) was prepared.

The PVA resin (8) thus prepared had a saponification degree of 99.0 mol % as determined by analysis of an alkali consumption required for hydrolysis of remaining vinyl acetate and 3,4-diacetoxy-1-butene. Further, the PVA resin (8) had an average polymerization degree of 360 as measured by analysis in conformity with JIS K6726, and a 1,2-dial structural unit content of 7.2 mol %.

A support material was produced in substantially the same manner as in Example 5, except that the 1,2-dial-containing PVA resin (8) prepared in the aforementioned manner was used instead of the PVA resin (5). Then, the support material was evaluated.

Example 11

A support material was produced by feeding 66.5 parts of the 1,2-dial-containing PVA resin (8) prepared in Example 10, 28.5 parts of the carboxyl group-containing SEBS used in Example 5 and 5 parts of ultrafine talc SG-95 (having a particle diameter of 2.5 μm) available from Nippon Talc Co., Ltd. as a filler into a twin screw extruder. Then, the support material was evaluated.

Example 12

A support material was produced in substantially the same manner as in Example 11, except that 56 parts of the 1,2-dial-containing PVA resin (8), 24 parts of the carboxyl group-containing SEBS and 20 parts of talc (filler) were used. Then, the support material was evaluated.

Comparative Example 2

A support material was produced in substantially the same manner as in Example 5, except that a carboxyl group-free SEBS (TOUGHTECH H1041 available from Asahi Kasei Corporation and having an acid value of 0 mg $CH_3ONa/g$) provided instead of the block copolymer of Example 5 and the PVA resin (5) were fed into a twin screw extruder and melt-kneaded. Then, the support material was evaluated in the same manner.

The results of the evaluation are also shown below in Table 3.

TABLE 3

| | Example 5 | Example 6 | Example 7 | Example 8 | Example 9 | Example 10 | Example 11 | Example 12 | Comparative Example 2 |
|---|---|---|---|---|---|---|---|---|---|
| Support material PVA resin | | | | | | | | | |
| Side chain 1,2-diol amount (mol %) | 0 | 0 | 0 | 0 | 6 | 7.2 | 7.2 | 7.2 | 0 |
| Polymerization degree | 500 | 500 | 500 | 500 | 450 | 360 | 360 | 360 | 500 |
| Saponification degree (mol %) | 88 | 72 | 88 | 88 | 88 | 99 | 99 | 99 | 88 |
| Proportion (parts) | 70 | 70 | 85 | 85 | 70 | 70 | 66.5 | 56 | 70 |
| Block copolymer | | | | | | | | | |
| Proportion (parts) | 30 | 30 | 15 | 15 | 30 | 30 | 28.5 | 24 | 30 |
| Acid value | 2 | 2 | 2 | 10 | 2 | 2 | 2 | 2 | 0 |
| Filler | | | | | | | | | |
| Proportion (parts) | 0 | 0 | 0 | 0 | 0 | 0 | 5 | 20 | 0 |
| Evaluation Peelability | | | | | | | | | |
| Flexibility | ○ | ○ | Δ | Δ | ○ | ○ | ○ | Δ | x |
| Toughness $N/mm^2$ | 46 | 44 | 58 | 62 | 72 | 64 | 60 | 43 | 12 |

TABLE 3-continued

|  | Example 5 | Example 6 | Example 7 | Example 8 | Example 9 | Example 10 | Example 11 | Example 12 | Comparative Example 2 |
|---|---|---|---|---|---|---|---|---|---|
| Forming stability | | | | | | | | | |
| Strand diameter stability | Δ | Δ | ○ | ○ | ○○ | ○○ | ○○ | ○○ | x |
| Smoothness of strand | | | | | | | | | |
| Surface state of strand | ○ | Δ | ○ | ○ | ○ | ○ | ○○ | ○○ | Δ |

As apparent from the above results, the support materials each including a PVA resin and a block copolymer including a polymer block of an aromatic vinyl compound and a polymer block of a conjugated diene compound and/or a block of a hydrogenated conjugated diene compound and having a functional group reactive with a hydroxyl group are more excellent in peelability and forming stability, and more useful for fusion laminate shaping than the support material (Comparative Example 2) including a PVA resin and a block copolymer having no functional group reactive with a hydroxyl group.

While specific forms of the embodiments of the present invention have been shown in the aforementioned inventive examples, the inventive examples are merely illustrative of the invention but not limitative of the invention. It is contemplated that various modifications apparent to those skilled in the art could be made within the scope of the invention.

The inventive laminate shaping support materials are excellent in shape stability, adhesiveness to a model material, peelability and forming stability, and can be advantageously used as support materials for the fusion laminate shaping process.

What is claimed is:

1. A method of forming a resin composition into a laminate-shaping support material comprising,
heat-melting a resin composition comprising a polyvinyl alcohol resin including a structural unit with a side chain having a primary hydroxyl group, and having a melting point heat of fusion of 10 to 30 J/g;
wherein the heat of fusion is measured by using a differential scanning calorimeter at a temperature increase rate of 10° C./min, and the heat of fusion is calculated based on a heat absorption peak area observed at the melting point in the temperature increase as heat $\Delta H$ (J/g) of fusion; and
wherein, in an analysis chart in which an abscissa axis is defined as an axis of temperature, the heat absorption peak area is an area enclosed by a base line and a heat absorption peak, the base line being defined as a straight line connecting a point A at a temperature higher by 5° C. than an end point of the absorption peak of a curve and a point B at a temperature lower by 40° C. than an apex of the heat absorption peak of the curve; and
forming the heat-melted resin composition into a laminate-shaping support material.

2. The method according to claim 1, wherein the side chain having a primary hydroxyl is a 1,2-diol structure.

3. The method according to claim 2, wherein the structural unit with a side chain having a primary hydroxyl group is a structural unit represented by the following formula (1):

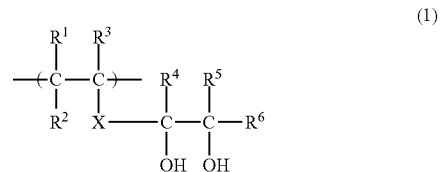

wherein $R^1$, $R^2$ and $R^3$ are independently each a hydrogen atom or a C1 to C4 alkyl group, X is a single bond or a bonding chain, $R^4$ is independently a hydrogen atom or a C1 to C4 alkyl group, and $R^5$ and $R^6$ are independently each a hydrogen atom.

4. A method for forming a laminate-shaped product comprising:
laying a layer of a laminate-shaping support material and a layer of a model material one on another in a fluid state;
solidifying the support material and the model material; and
removing the support material,
wherein the laminate-shaping support material consists of a resin composition comprising a polyvinyl alcohol resin including a structural unit with a side chain having a primary hydroxyl group, and having a melting point heat of fusion of 10 to 30 J/g;
wherein the heat of fusion is measured by using a differential scanning calorimeter at a temperature increase rate of 10° C./min, and the heat of fusion is calculated based on a heat absorption peak area observed at the melting point in the temperature increase as heat $\Delta H$ (J/g) of fusion; and
wherein, in an analysis chart in which an abscissa axis is defined as an axis of temperature, the heat absorption peak area is an area enclosed by a base line and a heat absorption peak, the base line being defined as a straight line connecting a point A at a temperature higher by 5° C. than an end point of the absorption peak of a curve and a point B at a temperature lower by 40° C. than an apex of the heat absorption peak of the curve.

* * * * *